(12) United States Patent
Sumiyoshi et al.

(10) Patent No.: US 6,631,153 B2
(45) Date of Patent: Oct. 7, 2003

(54) LIGHT GENERATING DEVICE AND LASER DEVICE USING SAID LIGHT GENERATING DEVICE

(75) Inventors: Tetsumi Sumiyoshi, Tokyo (JP); Hitoshi Sekita, Tokyo (JP); Akira Shiratori, Tokyo (JP)

(73) Assignee: Cyber Laser Inc., Tokyo (JP)

( * ) Notice: Subject to any disclaimer, the term of this patent is extended or adjusted under 35 U.S.C. 154(b) by 0 days.

(21) Appl. No.: 09/876,329

(22) Filed: Jun. 7, 2001

(65) Prior Publication Data

US 2002/0009115 A1 Jan. 24, 2002

(30) Foreign Application Priority Data

Jun. 8, 2000 (JP) ........................................ 2000-172798

(51) Int. Cl.[7] ................................................ H01S 3/10
(52) U.S. Cl. ........................................... 372/75; 372/70
(58) Field of Search ............................. 372/75, 55, 70, 372/71; 700/121

(56) References Cited

U.S. PATENT DOCUMENTS

| | | | | |
|---|---|---|---|---|
| 5,128,509 A | * | 7/1992 | Black et al. ............ 219/121.68 |
| 5,618,285 A | * | 4/1997 | Zair ............................... 606/10 |
| 6,031,854 A | * | 2/2000 | Ming ........................... 372/100 |
| 6,080,148 A | * | 6/2000 | Damasco et al. .............. 606/10 |
| 6,162,213 A | * | 12/2000 | Stewart ......................... 606/10 |
| 6,208,673 B1 | * | 3/2001 | Miyake ....................... 359/326 |
| 6,222,862 B1 | * | 4/2001 | Kinbara et al. .............. 363/165 |
| 6,331,993 B1 | * | 12/2001 | Brown .......................... 372/55 |
| 6,421,573 B1 | * | 7/2002 | Kafka et al. ................. 700/121 |

* cited by examiner

Primary Examiner—Paul IP
Assistant Examiner—Dung Nguyen
(74) Attorney, Agent, or Firm—Pearne & Gordon LLP

(57) ABSTRACT

The invention offers a low-noise, compact, high-efficiency light generating device and an irradiation method thereof for use in medical applications. A fundamental harmonic laser head 106 is composed of a quasi-continuous wave oscillation mode laser diode (QCW-LD) 101, a laser crystal 103, a rear mirror 104 and an output mirror 105. The QCW-LD 101 is driven by an LD power source 102 capable of modulating the pulse waveform in time. A beam adjusting portion 108 comprises a wave plate, a polarizer, a lens and an isolator. A wavelength converting portion 112 is an optical parametric oscillator (OPO) comprising a non-linear optical crystal 109, an OPO input mirror and an OPO output mirror 111.

14 Claims, 3 Drawing Sheets

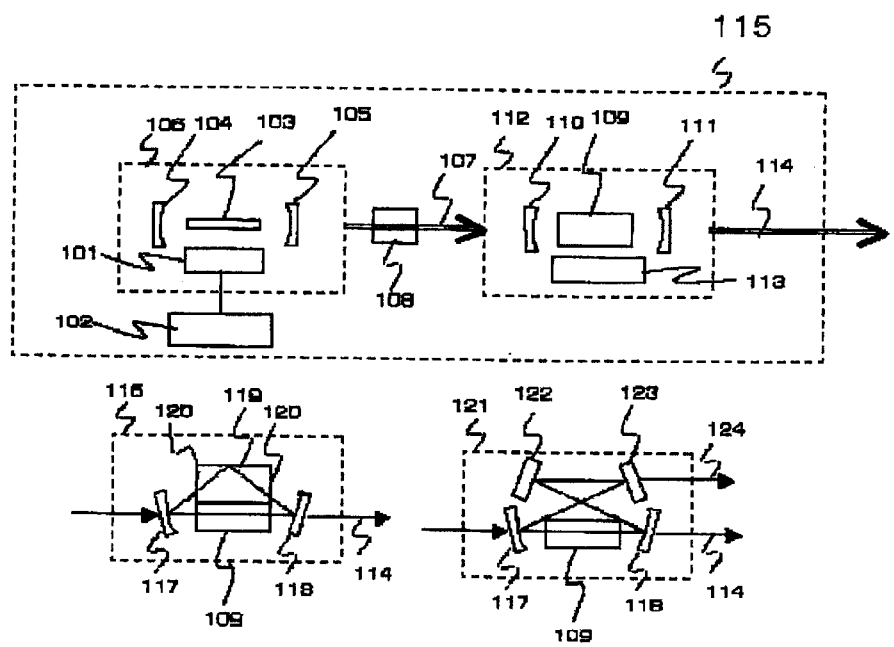
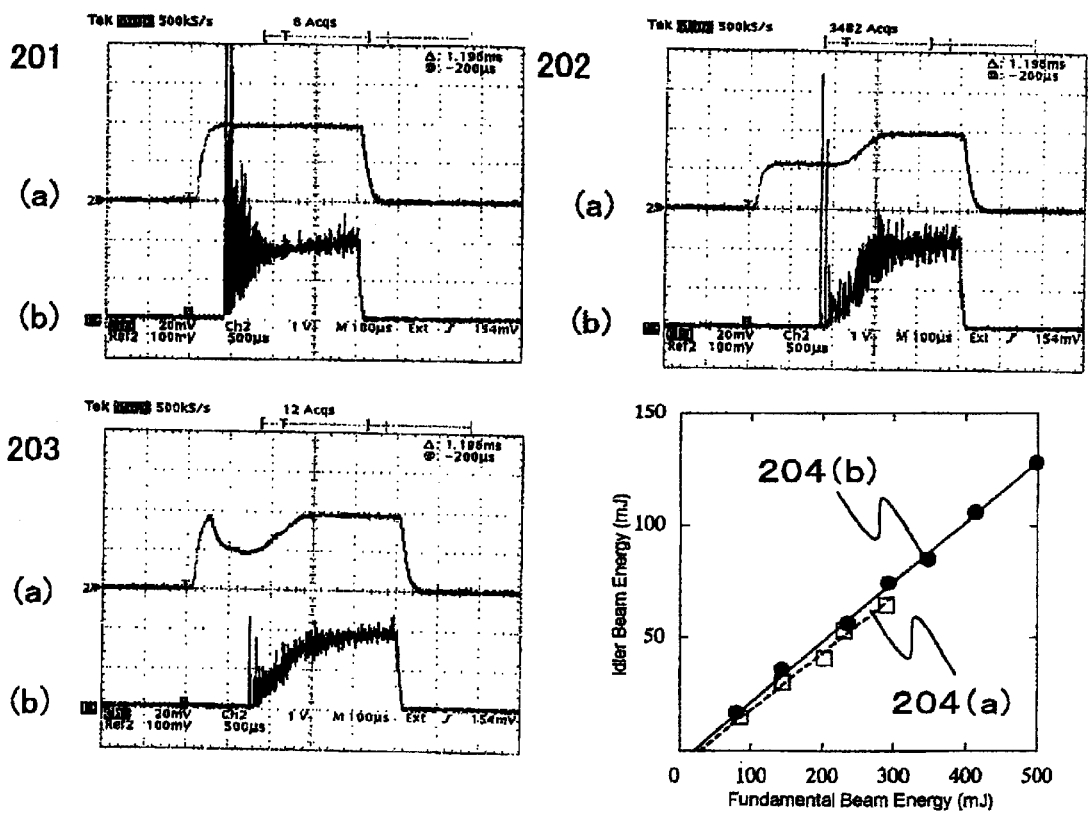
FIG. 1
FIG. 2

LIGHT GENERATING DEVICE AND LASER DEVICE USING SAID LIGHT GENERATING DEVICE

BACKGROUND OF THE INVENTION

The present invention relates to a wavelength-converted light generating device and an irradiation method therefor, capable of being used in medical applications, precision machining and various types of measurements.

As examples of lasers which have been conventionally used in the medical field, there are discharge-pumped carbon dioxide gas ($CO_2$ lasers), flash lamp-pumped neodymium ion-doped yttrium-aluminum-garnet (Nd:YAG) lasers and flash lamp-pumped erbium ion-doped yttrium-aluminum-garnet (Er:YAG) lasers.

Since $CO_2$ lasers oscillate at 9–10 $\mu$m, and have an absorption coefficient which is well-suited to organic soft tissue, they are often used as laser scalpels. However, they have the property of creating carbonized layers when cutting soft tissue, as a result of which the treated parts can be slow to heal. Additionally, since the lasing medium is $CO_2$ gas, the laser energy capable of being extracted per unit volume is small, so that the laser head must be made rather large, thereby forcing the $CO_2$ laser treatment devices themselves to be large.

On the other hand, Nd:YAG lasers have an oscillation wavelength of 1 $\mu$m, so that their absorption coefficient for organic tissue is extremely small, and they have come to be used mainly for coagulation of soft tissue. When used for cutting, a special blade-shaped optical component known as a contact tip is used to convert the laser beam into heat along the boundary between the soft tissue and the contact tip as the surgeon applies mechanical force to the contact tip. For this reason, the protein coagulation layer and thermally damaged layer at the cutting surface become s thick.

Therefore, the erbium-doped YAG (Er:YAG) laser which has an oscillation wavelength of 3 $\mu$m, at which the absorption coefficient with respect to organic soft tissue is highest has been developed, enabling precise cutting of hard tissue as well as soft tissue without applying any thermal damage to the areas around the exposed portions. However, since the excitation method for the Er:YAG lasers such as are currently available on the market is exclusively flash lamp excitation, the proportion of 3 $\mu$m laser light capable of being generated by the level of photon energy outputted by flash lamps is rather small, so small in fact, that the electro-photonic conversion efficiency, i.e. the ratio of the laser output to the power consumed by the device overall, is extremely low at less than 1%. Additionally, since flash lamp excitation involves making the lamp emit sudden bursts of light by applying several kilovolts of electricity, electromagnetic noise is generated, which increases the danger that electronic devices used for the surgical operation or implanted inside the body of the patient will malfunction.

In search of a method of generating high intensity light at an oscillation wavelength of 3 $\mu$m, research has gone into the development of semiconductor laser (LD) pumped Er:YAG lasers. While the operational modes include continuous wave and pulse types, in both cases, the problem of heat generated within the Er:YAG crystals has been an obstacle to the attainment of high outputs, so that the highest output power for a 3 $\mu$m laser which has been confirmed has been 1.2 W.

Additionally, as other forms of 3 $\mu$m light generating technology, a technique of wavelength-converting the output of an LD-pumped Nd:YAG laser with an oscillation wavelength of 1 $\mu$m to 3 $\mu$m light by means of non-linear optical crystals has been researched. According to W. R. Rosenberg et al., *Optics Letters* vol. 21, no. 17, p. 1336, 1996, an output of 3.55 W was achieved in continuous wave (CW) mode at a wavelength of 3.25 $\mu$m. Furthermore, L. E. Myers et al., *IEEE Journal of Quantum Electronics*, vol. 33, no. 10, pg. 1663, 1997 describes that the fundamental harmonic beam in the output of an LD-pumped Nd:YAG laser which was Q-switched at a repetition frequency of at least 30 kHz was wavelength-converted to 3–4 $\mu$m, thereby achieving an output of at least 3 W in this wavelength band.

The CW mode and Q-switched pulse mode are problematic for tissue removal treatments of hard tissue (especially dentin). In the CW mode, the energy density that is applied is inadequate to decompose enamel and dentin which are types of hard tissue, but the irradiated portions are thermally damaged. Furthermore, in the Q-switched mode, the pulse energy is small but the pulse width is short, thus resulting in a high peak power such that the heat due to the generation of plasma upon irradiation can damage even hard tissue. Additionally, with regard to the light generating devices, in the Q-switched mode, the peak of the fundamental beam pulse is so large that the end surfaces of the non-linear optical crystals used as wavelength converting portion can be damaged.

BRIEF SUMMARY OF THE INVENTION

The present invention has the purpose of achieving higher operational efficiency, suppressing the generation of electromagnetic noise which can have a detrimental influence on nearby electronic devices, making the devices more compact, reducing damage to organic tissue in the areas around the irradiated portions, preventing damage to non-linear optical crystals and enabling multi-functional treatments with a single laser treatment device.

With the laser device according to the present invention, a laser pulse emitted from a solid-state laser pumped by a quasi-continuous wave LD (QCW-LD) is taken as the fundamental beam, and light of a desired wavelength is created from this fundamental beam by means of non-linear optics. The pulse width of the laser pulse in time is on the order of sub-microseconds to milliseconds, and transient oscillations are minimized by changing the waveform of the drive current sent to the QCW-LD. This waveform is a deformed rectangular wave which reaches a maximum value and a minimum value prior to plateauing. In order to achieve higher efficiency in the device by means of high efficiency wavelength conversion, a periodically poled magnesium-doped lithium niobate crystal is used as the non-linear optical element. Furthermore, an OPO resonator using two OPO mirrors and an optical element for complete internal reflection is used. Also, beams of a plurality of wavelengths wavelength-converted by the non-linear optical element and the fundamental beam are simultaneously or independently used.

With a quasi-CW mode LD (QCW-LD) pumped format, it is possible to achieve high efficiency, reduced electromagnetic noise and miniaturization. Additionally, the higher efficiency of the wavelength converting portion results in higher efficiency for the device overall. By making the pulses generated by the wavelength-converted LD longer, plasma generation at the irradiated object is suppressed and the damage to the areas surrounding the irradiated portions is minimized. At the same time, by controlling the waveform in time of the QCW-LD pulse, the transient oscillations can be suppressed while obtaining the same level of energy as in the conventional technologies, thus reducing the peak power in the device and prolonging the life of the device.

By irradiating simultaneously with a plurality of beams of different wavelengths obtained by wavelength conversion, it is possible to obtain a combination processing effect. For example, when the object of irradiation in a medical application is soft organic tissue, it is possible to achieve the simultaneous action of a sharp incision by the wavelength corresponding to the absorption peak of the tissue and hemostasis by wavelengths longer than the absorption wavelength having lower absorption coefficients. Furthermore, by using secondary visible light components generated by wavelength conversion to guide the beams of wavelengths not visible to the eye, it is possible to offer a device that is suitable for application to medical treatments.

The present invention offers a compact, high-efficiency light generating device with rediced electromagnetic noise suitable for medical applications. Since this single light generating device is capable of outputting a plurality of beams of different wavelengths, it is possible to achieve a combination of functions. Additionally, the present invention can of course also be applied as a light source for industrial machining applications, photo fluorescence diagnosis and photo-acoustic diagnosis.

BRIEF DESCRIPTION OF THE DRAWINGS

FIG. 1 is a schematic diagram showing a wavelength-converted light generating device according to an embodiment of the present invention.

FIG. 2 shows the waveform of the electrical current used to drive the LD which is the fundamental beam source, the waveform in time of the fundamental beam pulse, and the input-output characteristics for wavelength conversion.

DETAILED DESCRIPTION OF THE INVENTION

Figure 3:
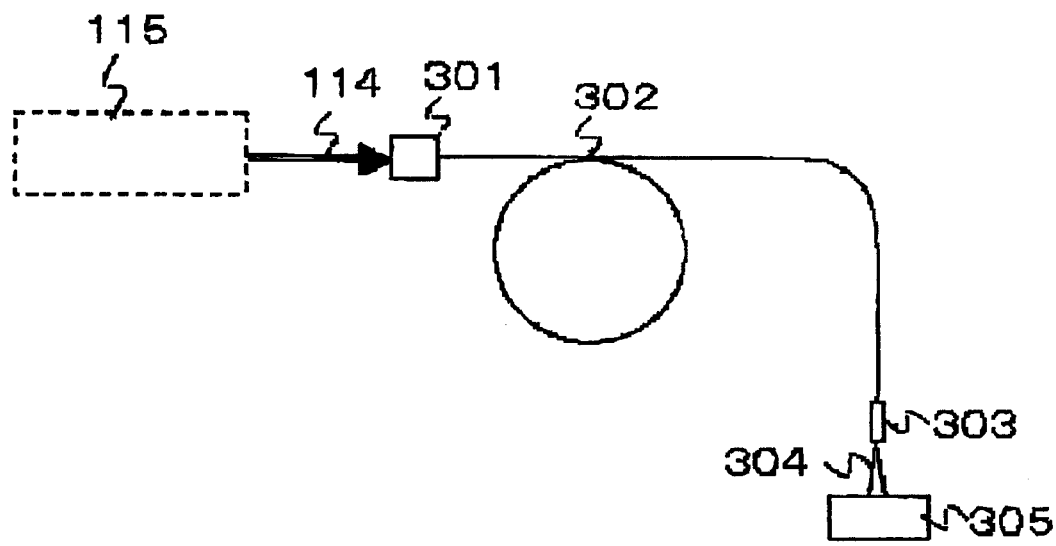
FIG. 3 is a schematic diagram showing a wavelength-converted light generating device for use in medical applications, comprising a flexible waveguide.

An embodiment of the present invention shall now be described with reference to the example of the wavelength-converted light generating device shown in FIG. 1. The fundamental beam laser head 106 is composed of a QCW-LD 101, a laser crystal 103, a rear mirror 104 and an output mirror 105. The QCW-LD 101 is driven by an LD power source 102 which is capable of modulating the pulse waveform in time. By using an LD-pumped fundamental beam laser, the electromagnetic noise generated from the light source is made small enough to ignore as compared with the lamp-pumped type.

A beam shaping portion 108 performs power modulation of the fundamental wave beam, modulation of the beam diameter, modulation of the polarization and prevents the creation of a return beam. In order to achieve this, the beam shaping portion 108 may be composed of a wave plate, polarizer, lens and isolator. The wavelength converting portion 112 is an optical parametric oscillator (OPO), composed of a non-linear optical crystal 109, an OPO input mirror 110 and an OPO output mirror 111. The temperature of the non-linear optical crystal 109 is adjusted by a temperature regulator 113, in order to adjust the phase of the fundamental beam and the wavelength-converted beam. Additionally, by maintaining a high temperature, it is possible to overcome photorefractive damage inside the non-linear optical crystal 109. For example, if periodically poled lithium niobate is used as the non-linear optical crystal, the temperature should be kept at 180° C. Furthermore, by using periodically poled lithium niobate as the non-linear optical crystal, wavelength conversion can be performed at room temperature by making use of an increase in the threshold value for photorefractive damage. In this case, the temperature regulator 113 can be removed to make the device smaller and reduce the power consumption.

When converting the fundamental beam into two wavelengths in an OPO resonator, the fundamental beam is called the pump beam, and of the two generated beams, the one with the longer wavelength is called the idler beam and the one with the shorter wavelength is called the signal beam. The OPO output beam 114 includes these, that is, an idler beam, a signal beam and a pump beam, as well as the sum harmonic and higher order harmonics of these components. The OPO resonator traps at least one of the idler beam and the signal beam inside the resonator, and makes it interact with the pump beam inside the non-linear optical crystal 109. Since it need only be a mirror structure having the appropriate properties, it does not have to be the two-mirror resonator of the wavelength converting portion 112 shown in FIG. 1, and can be composed of a three-mirror resonator 116 or a four-mirror resonator 121.

In the case of the two-mirror resonator shown in the wavelength converting portion 112, the fundamental beam is reflected slightly at the end surfaces of the OPO input mirror 110, non-linear optical crystal 109 and OPO output mirror 111, and is fed back along the same axis to the fundamental beam laser head. In order to cancel the return beam, an isolator is contained inside the beam shaping portion 108.

Using the four-mirror resonator 121, it is possible to reduce the return beam, and therefore to remove the isolator. With a four-mirror resonator 121, it is possible to newly generate an OPO beam 124 by raising the transmissivity of the OPO mirror 123 with respect to the resonance wavelength. This is useful when wishing to extract the signal beam along a different optical axis from the idler beam. However, since a lot of labor is expended for the assembly work in order to make fine adjustments to the four mirrors, a three-mirror resonator 116 formed by making use of the complete internal reflection property of a glass slab 119 may be used. In this three-mirror resonator 116, the generation of a return beam due to reflection off the end surfaces of the optical elements can be held low, and therefore the isolator can be removed. In the present embodiment, a slab 119 composed of BK7 glass is used. A coating that is non-reflective with respect to the signal beam or idler beam is applied to both surfaces of the slab 119. The wavelength-converted beam output properties of the three-mirror resonator 116 and four-mirror resonator 121 are the same.

A pulse time waveform for the case where a QCW-LD with an oscillation wavelength of 808 nm is used as the QCW-LD 101 and Nd:YAG is used as the laser crystal 103 shall be described with reference to FIG. 2. If the drive current waveform is a rectangular pulse waveform 201(*a*), the waveform of the fundamental wave beam 107 will have the fundamental beam pulse waveform 201(*b*). The pulse has a high peak at the front portion, the portion where the power oscillates being known as the transient oscillation portion. The peak of this transient oscillation potion is sufficiently smaller than that of a Q-switched pulse action high-repetition laser with the equivalent average power, so that even if a pulse having this waveform is used as the pump beam, it will be contained within the range of safe use of the optical components in the wavelength converting portion 112 and the optical parts in the beam shaping portion 108. This range of safe use is specific to each optical component, largely depending on the pump beam intensity and pulse width, with damage occurring first in the parts having the lowest damage threshold. That is, in the case of a fundamental pulse waveform 201(b) generated by a solid-state laser due to excitation with a rectangular current waveform 201(a), the transient oscillations occurring simultaneously with the beginning of oscillation are highly likely to cause damage not only to the object of irradiation, but also to the optics inside the OPO resonator. For this reason, the transient oscillation peak must be reduced in order to expand the range of safe use.

By modulating the drive current pulse waveform to produce the modulated current waveform 202(a), the fundamental beam pulse waveform 202(b) with a reduced transient oscillation peak is generated. As shown in the drawing, the rise portion of the modulated current waveform 202(a) is stepped. The transient oscillation peak of the fundamental beam pulse waveform 202(b) obtained in this way is reduced to roughly ½ the peak of the fundamental pulse waveform 201(b) for the case where a rectangular current waveform 201(a) is used as described above (the peak value of the waveform 201(b) lies outside the borders, and the peak value itself cannot be read from the drawing). Therefore, by using a current waveform 202(a) which has a stepped rise, the transient oscillation peak is reduced, thereby expanding the range of safe use inside the resonator.

Reference number 203 in FIG. 2 illustrates a fundamental pulse waveform for the case where yet a different current waveform is used. The current waveform has a rise portion in the form of a rectangular wave, and reaches a maximum value and a minimum value before reaching the plateau value. In this case, the suppression effect on the transient oscillation peak is very apparent, with the transient oscillation peak held to less than ⅓ of the case where a rectangular current waveform 201(a) is used. As a result, even when periodically poled lithium niobate is used as the non-linear optical crystal, there is no damage to the crystal end surfaces. It is not always necessary to use the shape of 202(a) in order to suppress the transient oscillation peak, and any shape in which the rise portion of the rectangular wave does not immediately reach the plateau current, such as a ramp function or step function will be effective.

With a pulse having this type of fundamental beam pulse waveform and a full width at half maximum of 400 microseconds as the excitation beam, conversion efficiencies of respectively 25% and 15% were obtained with an idler beam of 2.94 microns and a signal beam of 1.67 microns with PPLN as the non-linear optical crystal. The resonator that was used was a four-mirror resonator 121, with the reflectivities of the mirrors with respect to the pump beam, idler beam and signal beam being respectively less than 1%, less than 3% and more than 99% for the OPO input mirror 117, the OPO output mirror 118 and the OPO mirror 122. The reflectivities of the OPO mirrors 123 were respectively less than 1%, less than 3% and 90%, with the signal beam inside the OPO resonator being extracted as an OPO output beam 124 with an output coupling rate of 10%. In this case, the OPO output beam 114 was the idler beam and the OPO output beam 124 was the signal beam, so that the beams of each wavelength were able to be used separately. When the fundamental beam had an energy 500 mJ, the idler beam with a wavelength of 1.94 microns was at 125 mJ and the signal beam with a wavelength of 1.67 microns was at 75 mJ. The shape of the modulated current waveform 202(a) is not unique, so that it is possible to hold the current to about the oscillation threshold value of the Nd:YAG laser for a long time at the front portion of the pulse waveform, then increase the current to maximum simultaneously with oscillation. When the fundamental beam pulse waveform 201(b) was used, there was damage to the PPLN end surfaces at a fundamental beam pulse energy of 300 mJ as shown in the input-output properties 203(a). This can be surmised to be due to the fact that the signal beam and pump beam generated in the transient oscillation peak portion and trapped inside the OPO resonator overlapped at the PPLN end surfaces, thus exceeding the damage threshold value of the PPLN end surfaces. On the other hand, when the fundamental beam pulse waveform 202(b) was used, there was no damage to the optical elements even with a fundamental beam pulse energy of 500 mJ as indicated by the input-output properties 203(b), thus allowing for higher outputs.

A method of irradiation of an OPO output beam 114 generated by the above-described light generating device shall be described with reference to FIG. 3. As wavelength converting portion, a four-mirror resonator 121 was used, with the reflectivities of the pump beam, idler beam and signal beam being respectively less than 1%, less than 3% and more than 99% at the OPO mirror 123, and changed to respectively less than 1%, less than 3% and 90% at the OPO output mirror 113, thereby obtaining an idler beam and signal beam along the same axis as the OPO output beam 114. The OPO output beam 114 had its spatial divergence corrected by a beam adjusting portion 301 so as to match the numerical aperture of a flexible waveguide 302 into which it was inputted. It is also possible to omit the beam adjusting portion 301 by adjusting the mirror curvatures of the OPO input mirror and OPO output mirror in the OPO resonator so that the divergence of the OPO output beam 114 matches the numerical aperture of the flexible waveguide 302. Specifically, by making the radius of curvature of the OPO input mirror and OPO output mirror 100 mm, it was possible to achieve direct coupling to a hollow waveguide with a numerical aperture of 0.1 and an inner diameter of 700 microns. The incident loss was 10%.

As a flexible waveguide 302, it is possible to choose among a hollow fiber, sapphire fiber, fluoride gas fiber and a germanium oxide fiber capable of transmitting a beam in the 3 micron wavelength band such as the idler beam.

The beam adjusting portion 303 was provided for the purpose of changing the intensity of the OPO output beam 304 with respect to the object of irradiation 305. The beam adjusting portion 303 was made from anhydrous silica glass or a germanium oxide type glass. The beam adjusting portion 303 can be removed if necessary.

Since the idler beam and signal beam are contained in the OPO output beam, at least two functions are achieved when the object of irradiation is soft organic tissue. That is, while making precise cuts with the idler beam at the wavelength of 2.94 microns which corresponds to the absorption peak of water, coagulation of microscopic blood vessels was performed with the signal beam at the wavelength of 1.67 microns for hemostasis. Since the OPO output beam is a pulse with the peak power due to transient oscillations and the like held down as described above, excessive generation of plasma in the object of irradiation 305 was not observed, thus confirming that the shielding of light due to the plasma and heating due to plasma absorption was suppressed.

Therefore, damage such as carbonization and cracks near the irradiated portions did not occur. It was also confirmed that when the object of irradiation 305 is hard tissue, such as in the case of dentin or bone, an efficient bore hole could be made by the idler beam in the 3 micron band which corresponds to the absorption peak of water. In this case, the shape of the beam adjusting portion 303 was that of a cone with a flattened vertex, and the bottom surface was used to couple to the output end of the waveguide. The energy per unit area during irradiation was 30 J/cm$^2$. At this time, the 1.67 micron signal beam was contained in the OPO output beam 124 of FIG. 1, and the waveguide coupled to the OPO output beam 114 mainly transmitted the idler beam.

Figure 4:
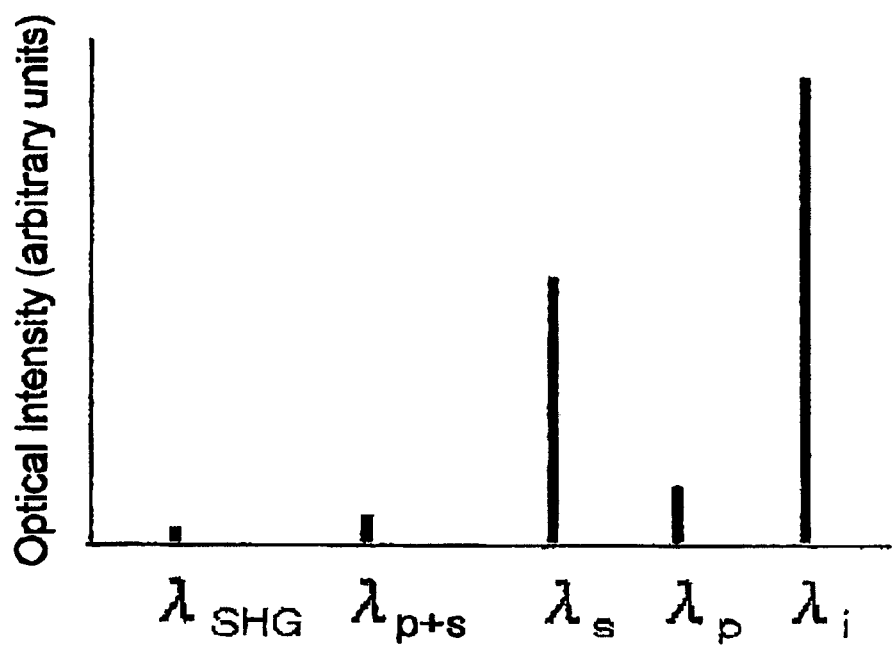
FIG. 4 shows the wavelengths of the beams generated by the wavelength converting portion.

FIG. 4 some of the wavelengths generated inside the OPO resonator. $\lambda$ indicates a wavelength, and the subscripts p, i, s, SHG and p+s respectively denote the pump beam, the idler beam, the signal beam, the second harmonic, and the sum harmonic of the pump beam and the signal beam. When the pump beam wavelength was 1.064 microns and the idler beam wavelength was 2.94 microns, the signal beam wavelength was 1.67 microns, the second harmonic was at 0.532 microns (visible, color green) and the sum harmonic was at 0.65 microns (visible, color red). The latter green and red beams were outputted in the direction of the OPO output beam 114 in FIG. 1 along the same axis as the idler beam. Since energy is distributed from the energy of the pump beam to other harmonic beams, the pump beam energy in FIG. 4 was small. Since the beam which is actually used for treatment is the idler beam, it is not possible for the surgeon using this light source to see with the naked eye where the beam is on the portions being treated. Accordingly, by making the beam adjusting portion 301, 303 and waveguide 302 out of optical materials that transmit visible light, it is possible to use the visible portion as guides to indicate the portions which are being treated.

Figure 5:
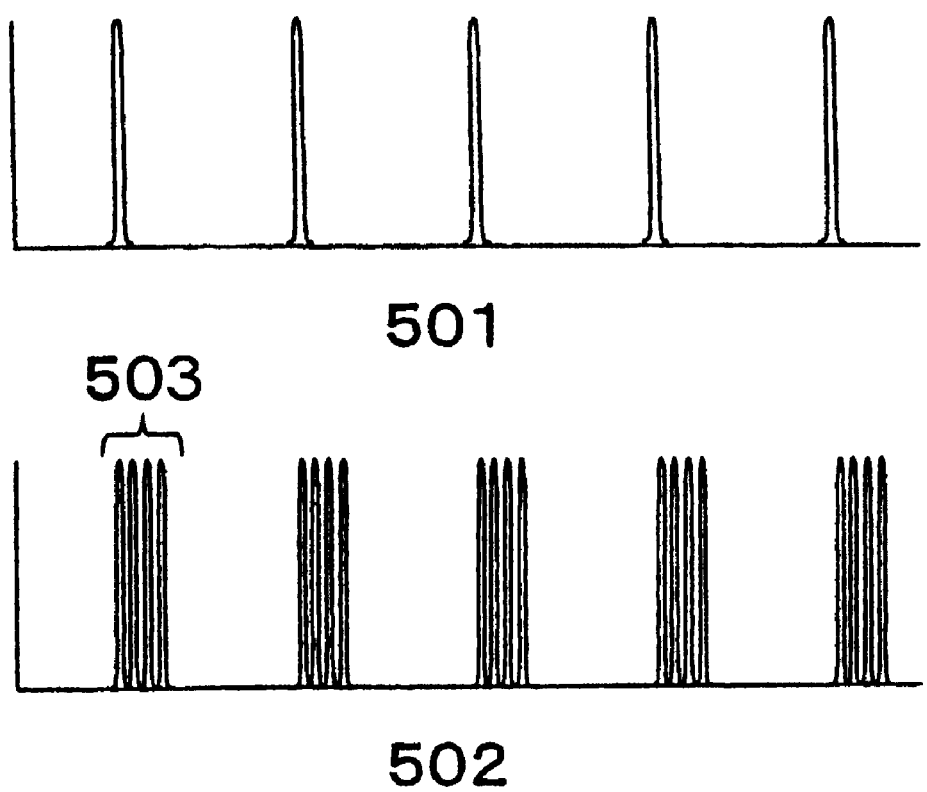
FIG. 5 is a diagram showing the sequences in time of fixed and modulated repetition operations.

When processing organic tissue with an OPO output beam, thermal damage may occur due to a cumulative heat effect if the repetition frequency is too high. For this reason, the repetition frequency is usually reduced to be on the order of 10 Hz as indicated by the regular repetition mode 501 shown in the top part of FIG. 5, and by also spraying cooling fluid onto the laser irradiation portion, surface temperature increases can be suppressed with each pulse, thus preventing thermal damage to the object of irradiation. However, if the energy per pulse is constant and the repetition frequency is low, the irradiation power becomes low, thereby reducing the work efficiency. Therefore, when the object of irradiation is dentin, a unit pulse sequence 503 of 4 shot pulses with a repetition frequency of 500 Hz as shown in the bottom of FIG. 5 was used, this being performed at 10 Hz as a modulated repetition mode 502. As compared with the regular repetition mode 501, the irradiation power was increased fourfold, and the work efficiency in terms of time was increased. Furthermore, since the object of irradiation was cooled after each unit pulse sequence, surface temperature increases were suppressed and thermal damage did not occur. The repetition frequency and number of pulses in each unit pulse sequence and the repetition frequency of the unit pulse sequence in the modulated repetition mode 502 are determined by the thermal properties of the object of irradiation. The modulation of the repetition mode was performed by modulating the generation of current pulses in the LD power source. Thus, it is possible to have a modulated pulse mode combining two or more repetition frequencies. As another method, it is possible to execute a modulated pulse mode by cutting the OPO output beam pulse sequence generated in a high repetition mode using an electromagnetic shutter or electro-optic switch.

What is claimed is:

1. A light generating device comprising:
    a quasi-continuous wave LD-pumped solid state laser for generating a laser pulse having a pulse width in time on the order of sub-microseconds to milliseconds;
    an LD power supply portion for supplying an electrical current to said quasi-continuous wave LD-pumped solid state laser, said LD power supply portion being capable of modulating the electrical current value within a pulse time width; and
    wavelength converting portion for converting the oscillation wavelength of the laser pulse generated by said quasi-continuous wave LD-pumped solid state laser to create a wavelength-converted pulse beam;
    wherein said LD power supply portion supplies an electrical current in the form of a deformed rectangular wave reaching a maximum value and minimum value prior to plateauing, thereby suppressing transient oscillation peaks.

2. A light generating device in accordance with claim 1, wherein said quasi-continuous wave LD-pumped solid state laser is an LD-pumped solid state laser with an output power that is variable within a pulse time width.

3. A light generating device in accordance with claim 1, wherein said quasi-continuous wave LD-pumped solid state laser is capable of modulated repetition action, wherein a plurality of pulses are consecutively generated, after which some time is allowed to pass before generated the next plurality of consecutive pulses.

4. A light generating device in accordance with claim 1, wherein said wavelength converting portion is an optical parametric oscillator composed of a non-linear optical crystal and a resonator.

5. A light generating device in accordance with claim 4, wherein said non-linear optical crystal is a periodically poled magnesium-doped lithium niobate crystal.

6. A light generating device in accordance with claim 4 or 5, wherein said resonator comprises two mirrors and an optical element with complete internal reflection.

7. A light generating device in accordance with claim 1, comprising at least one flexible light guiding portion for transmitting said wavelength-converted beam, capable of irradiating objects of irradiation at different positions with a laser beam without moving said solid state laser and wavelength converting portion.

8. A light generating device in accordance with claim 1, wherein said wavelength converting portion creates a plurality of beams with different wavelengths, and at least one of the wavelength-converted beams is a component within the wavelength range of visible light to 10 $\mu$m or less.

9. A laser device comprising a light generating device as claimed in claim 1.

10. A laser device in accordance with claim 9, wherein a visible beam created by said wavelength converting portion is used as a guide beam.

11. A laser device in accordance with claim 9 or 10 wherein damage due to plasma and acoustic waves upon irradiation does not occur on the object of processing.

12. A laser device in accordance with claim 9, used for medical applications, wherein said pulse beam is an idler beam in the 3 micron band, and said idler beam is used to cut the object of irradiation.

13. A laser device in accordance with claim 9, used for medical applications, wherein said pulse beam is a signal beam generated simultaneously with a idler in the 3 micron band, and said signal beam is used for hemostasis of the object of irradiation.

14. A laser device in accordance with claim 9, used for medical applications, wherein said pulse beam is an idler beam in the 3 micron band and a signal beam generated simultaneously with said idler beam, and said idler beam is used to cut the object of irradiation while said signal beam is used for hemostasis of the object of irradiation.

* * * * *